United States Patent
Vik et al.

(10) Patent No.: US 9,691,156 B2
(45) Date of Patent: Jun. 27, 2017

(54) OBJECT IMAGE LABELING APPARATUS, METHOD AND PROGRAM

(71) Applicant: KONINKLIJKE PHILIPS N.V., Eindhoven (NL)

(72) Inventors: Torbjørn Vik, Hamburg (DE); Daniel Bystrov, Hamburg (DE); Heinrich Schulz, Hamburg (DE); Nicole Schadewaldt, Norderstedt (DE); Jochen Peters, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 200 days.

(21) Appl. No.: 14/374,923

(22) PCT Filed: Jan. 28, 2013

(86) PCT No.: PCT/IB2013/050720
§ 371 (c)(1),
(2) Date: Jul. 28, 2014

(87) PCT Pub. No.: WO2013/114262
PCT Pub. Date: Aug. 8, 2013

(65) Prior Publication Data
US 2015/0036900 A1  Feb. 5, 2015

Related U.S. Application Data

(60) Provisional application No. 61/593,466, filed on Feb. 1, 2012.

(51) Int. Cl.
*G06K 9/00* (2006.01)
*G06T 7/00* (2017.01)
(Continued)

(52) U.S. Cl.
CPC .......... *G06T 7/0087* (2013.01); *G06K 9/6206* (2013.01); *G06T 7/12* (2017.01);
(Continued)

(58) Field of Classification Search
CPC ........ G06K 9/6206; G06T 2207/20128; G06T 7/0083; G06T 7/0087
See application file for complete search history.

(56) References Cited

U.S. PATENT DOCUMENTS 8,577,115 B2   11/2013   Gering et al.
8,989,460 B2    3/2015   Mahfouz
(Continued)

FOREIGN PATENT DOCUMENTS

WO   2011071363 A2   6/2011
WO   2011093921 A1   8/2011
WO   2012012768 A1   1/2012

OTHER PUBLICATIONS

Qazi, A. et al. "Probabilistic Refinement of Model-Based Segmentation: Application to Radiation Therapy Planning of the Head and Neck", (Sep. 19, 2010), Medical Imaging and Augmented Reality, Springer Berling Heidelberg, pp. 403-410.
Rohlfing, T. et al. "Quo Vadis, Atlas-Based Segmentation?" (2005) http://www.neurobiologic.fu-berlin.de/menzel/Pub__AGmenzel/Rohlfing_etal_2005_Preprint_Chapter_Handbook_Med_Imaging.pdf.

*Primary Examiner* — Siamak Harandi
*Assistant Examiner* — Ian Lemieux

(57) ABSTRACT

The invention relates to a labeling apparatus (1) for labeling structures of an object shown in an object image. A probability map providing unit (3) provides a probability map, the probability map indicating for different labels, which are indicative of different structures of the object, and for different positions in the probability map the probability that the respective structure, which is indicated by the respective label, is present at the respective position, wherein the probability depends on the position in the probability map.

(Continued)

The probability map is mapped to the object image by a mapping unit (4), wherein a label assigning unit (5) assigns to a provided contour, which represents a structure in the object image, a label based on the mapped probability map. This allows automatically labeling structures of the object, which are indicated by provided contours in the object image, with relatively low computational efforts.

14 Claims, 4 Drawing Sheets

(51) Int. Cl.
*G06K 9/62* (2006.01)
*G06T 7/12* (2017.01)
*G06T 7/143* (2017.01)
(52) U.S. Cl.
CPC .... *G06T 7/143* (2017.01); *G06T 2207/10072* (2013.01); *G06T 2207/20076* (2013.01); *G06T 2207/20096* (2013.01); *G06T 2207/20128* (2013.01); *G06T 2207/20216* (2013.01); *G06T 2207/30004* (2013.01)

(56) References Cited

U.S. PATENT DOCUMENTS

| | | |
|---|---|---|
| 2006/0115145 A1 | 6/2006 | Bishop et al. |
| 2009/0226060 A1 | 9/2009 | Gering et al. |
| 2009/0279772 A1* | 11/2009 | Sun .................. G06K 9/6298 382/141 |
| 2010/0054525 A1* | 3/2010 | Gong .................. G06K 9/6206 382/100 |
| 2010/0098309 A1 | 4/2010 | Graessner et al. |
| 2010/0275145 A1 | 10/2010 | Nijlunsing et al. |
| 2011/0019889 A1* | 1/2011 | Gering .................. A61B 6/032 382/131 |
| 2011/0188715 A1 | 8/2011 | Shotton et al. |
| 2011/0245650 A1* | 10/2011 | Kerwin .................. G06T 7/174 600/407 |
| 2013/0188846 A1* | 7/2013 | Kriston .................. G06T 7/187 382/130 |
| 2014/0247977 A1* | 9/2014 | Han .................. G06K 9/34 382/159 |

\* cited by examiner

OBJECT IMAGE LABELING APPARATUS, METHOD AND PROGRAM

This application is a national stage application under 35 U.S.C. §371 of International Application No. PCT/IB2013/050720 filed on Jan. 28, 2013 and published in the English language on Aug. 8, 2013 as International Publication No. WO/2013/114262, which claims priority to U.S. Application No. 61/593,466 filed on Feb. 1, 2012, the entire disclosures of which are incorporated herein by reference.

FIELD OF THE INVENTION

The invention relates to a labeling apparatus, a labeling method and a labeling computer program for labeling structures of an object shown in an object image.

BACKGROUND OF THE INVENTION

US 2011/0188715 A1 discloses a device for automatically identifying organs in a medical image. The device comprises a communication interface for receiving the medical image, at least one processor and a memory for storing a decision forest comprising a plurality of distinct trained decision trees. The at least one processor selects an image element from the medical image, applies the image element to each of the trained decision trees to obtain a plurality of probabilities of the image element representing one of a plurality of predefined classes of organ, aggregates the probabilities from each of the trained decision trees and assigns an organ classification to the image element in dependence thereon. This automatic identification of organs in a medical image using the decision forest comprising the plurality of distinct trained decision trees is computationally relatively complex.

SUMMARY OF THE INVENTION

It is an object of the present invention to provide a labeling apparatus, a labeling method and a labeling computer program for labeling structures of an object shown in an image, wherein the labeling can be performed with reduced computational efforts.

In a first aspect of the present invention a labeling apparatus for labeling structures of an object shown in an image is presented, wherein the labeling apparatus comprises:

a contour providing unit for providing a contour representing a structure in the object image, a probability map providing unit for providing a probability map, the probability map indicating for different labels, which are indicative of different structures of the object, and for different positions in the probability map the probability that the respective structure, which is indicated by the respective label, is present at the respective position, wherein the probability depends on the position in the probability map, a mapping unit for mapping the probability map to the object image such that the positions in the probability map are assigned to positions in the object image, and a label assigning unit for assigning to the contour a label based on the mapped probability map Since the label is assigned to the contour based on the probability map, which has been mapped to the object image such that the positions in the probability map are assigned to positions in the object image, the structures of the object can be labeled automatically based on the probability map with relatively low computational efforts.

The labeling apparatus preferentially further comprises a display unit for displaying the object image, the contour and the label.

It is preferred that the contour providing unit is adapted to allow a user to add a contour to the object image for providing the contour. The contour providing unit is preferentially a graphical user interface allowing a user to draw a contour in the object image. Thus, a user can add a desired contour to the object image, wherein the labeling apparatus then automatically assigns an appropriate label to the contour. The contour providing unit can also be a storing unit, in which the contour is stored already and from which the contour can be retrieved for providing the same, or the contour providing unit can also be a receiving unit for receiving a contour from another unit being, for instance, an input unit, which is adapted to allow a user to input a contour into the object image, and for providing the received contour.

It is further preferred that the mapping unit is adapted to register the object image and the probability map with respect to each other for performing the mapping. In particular, the probability map providing unit can be adapted to provide the probability map together with a registration image being registered with the probability map, wherein the mapping unit can be adapted to register the object image with respect to the registration image, in order to register the object image and the probability map with respect to each other. The probability map can have been determined based on several object images, for instance, based on several computed tomography images of the object, wherein in these object images desired contours are indicated and labeled already. These object images can be regarded as being training images for training the probability map providing unit. The registration image can be an average image being generated by averaging the object images used for determining the probability map. Such an average image is inherently registered with the resulting probability map such that by registering an actual object image with the average image being the registration image the actual object image is also registered with respect to the probability map.

In a preferred embodiment the probability map providing unit is adapted to provide the probability map such that the probability that the respective structure, which is indicated by the respective label, is present at the respective position additionally depends on an image value. Thus, the probability may not only depend on the position of the respective image element, but also on the image value of the respective image element. In particular, after the probability map has been mapped to the actual object image, for each label a respective probability can be assigned to each image element of the actual object image, which depends on the position of the respective image element within the actual object image and on the image value, for instance, on the grey value, of the respective image element. The additional consideration of the image values can improve the quality of the probabilities assigned to the image elements of the object image, thereby improving the accuracy of labeling the contour.

The label assigning unit can be adapted to a) define positions of image elements in accordance with the provided contour and with a predefined definition rule, the predefined definition rule defining positions of image elements depending on a contour, b) determine for each label a label probability depending on the probabilities which are defined by the mapped probability map and the defined positions of image elements, and c) assign the label to the contour for which the largest label probability has been determined. The predefined definition rule defines the image elements, which should be considered for determining the label of the respective contour, given the provided contour. For instance, the predefined definition rule can define positions of image elements within the contour, if the contour is closed, wherein the label assigning unit can be adapted to determine for each label an integral probability as the label probability by integrating the probabilities defined by the mapped probability map and by the defined positions of the image elements within the contour. For instance, the object image can be a three-dimensional image, of which two-dimensional slices are shown on the display unit. A user can review the three-dimensional image slice by slice, wherein in each slice the user can draw one or several contours, which are then automatically labeled by the label assigning unit. For assigning a label to a contour the label assigning unit can be adapted to calculate for each label the integral of the probabilities assigned to the respective label over the area enclosed by the contour. The label, for which the largest integral probability has been calculated, is assigned to the respective contour.

In an embodiment the probability map providing unit is adapted to provide the probability map such that the probability that the respective structure, which is indicated by the respective label, is present at the respective position additionally depends on an image value, wherein the label assigning unit is adapted to determine for each label the label probability depending on the probabilities which are defined by the mapped probability map, the defined positions of image elements and the image values of the object image at these defined positions. Also in this embodiment the predefined definition rule can define positions of image elements within the contour, if the contour is closed, wherein the label assigning unit can be adapted to determine for each label an integral probability as the label probability by integrating the probabilities defined by the mapped probability map, the defined positions of the image elements within the closed contour and the image values of the object image at these defined positions. Thus, in this embodiment the integral probability does not only depend on the positions of the image elements within the contour, but also on the image values, in particular, on gray values, of the image elements within the contour. For each label a probability is assigned to each image element within the contour, wherein the respective probability is defined by the position of the respective image element within the object image and by the respective image value of the respective image element, wherein the respective probability is provided by the mapped probability map. The additional consideration of the image values increases the accuracy of labeling the respective contour.

The predefined definition rule can also define positions of image elements traversed by the contour and in the vicinity of the contour. Since the probability map has been mapped to the actual object image, to each of these defined positions a probability is assigned, which optionally does not only depend on the respective position, but also on the image value of the image element at the respective position. An area enclosing the contour can be determined and the label can be determined which has the largest probability value within the area. The area can be defined by a predefined distance to the line defining the contour, wherein all positions of the object image which are within the distance are considered. The predefined distance can be a predefined distance in terms of image elements, i.e. voxels or pixels. The label assigning unit can also be adapted to determine the label having the largest integral probability with respect to the area and to assign this label to the contour.

In an embodiment, the probability map providing unit is adapted to determine a probability map and to provide the determined probability map, wherein the probability map providing unit is adapted to a) receive several images of the object, wherein the images include labeled contours such that to at least some positions within the respective image a label is assigned, and b) determine the probability map based on the received several images with the labeled contours. In particular, the probability map providing unit is adapted to determine the probability map by determining for each label and each position in the images the occurrence of the respective label at the respective position in the images, and determining for different labels and for different positions the probability that the respective structure, which is indicated by the respective label, is present at the respective position based on the determined occurrences. The received several images can be training images, which are contoured and labeled by a user like a physician and which are used by the probability map providing unit for determining the probability map. The newly determined probability map can also be combined with an already existing probability map, in order to update the existing probability map.

In an embodiment the probability map providing unit is adapted to determine an intermediate probability map based on the object image with the provided contour and to update the provided probability map based on the intermediate probability map. Thus, the actual object image can be used to update the probability map. In this way a user can add a new label to the probability map by adding a corresponding contour and a corresponding new label to the actual object image, wherein the probability map providing unit can determine the intermediate probability map based on the actual object image comprising the contour with the new label and update the provided probability map based on the intermediate probability map such that the resulting updated probability map also comprises the new label.

It is further preferred that the contour providing unit is adapted to provide several contours to the object image, wherein the label assigning unit is adapted to assign to each contour a label based on the mapped probability map and wherein the labeling apparatus can further comprise an aggregation unit for aggregating contours having the same label. In other words, if several contours are provided in the object image in particular, if a user has drawn several contours in the object image, wherein to some contours the same label has been assigned, the aggregation unit can aggregate these contours having the same label. The labeling apparatus can further comprise a correction unit allowing a user to modify a label assigned to a contour.

In a further aspect of the present invention a labeling method for labeling structures of an object shown in an object image is presented, wherein the labeling method comprises:

providing a contour representing a structure in the object image by a contour providing unit, providing a probability map by a probability map providing unit, the probability map indicating for different labels, which are indicative of different structures of the object, and for different positions in the probability map the probability that the respective structure, which is indicated by the respective label, is present at the respective position, wherein the probability depends on the position in the probability map, mapping the probability map to the object image by a mapping unit such that the positions in the probability map are assigned to positions in the object image, and assigning to the contour a label based on the mapped probability map by a label assigning unit.

In a further aspect of the present invention a labeling computer program for labeling structures of an object shown in an object image is presented, wherein the labeling computer program comprises program code means for causing a labeling apparatus as defined in claim 1 to carry out the steps of the labeling method as defined in claim 13, when the labeling computer program is run on a computer controlling the labeling apparatus.

It shall be understood that the labeling apparatus of claim 1, the labeling method of claim 13, and the labeling computer program of claim 14 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
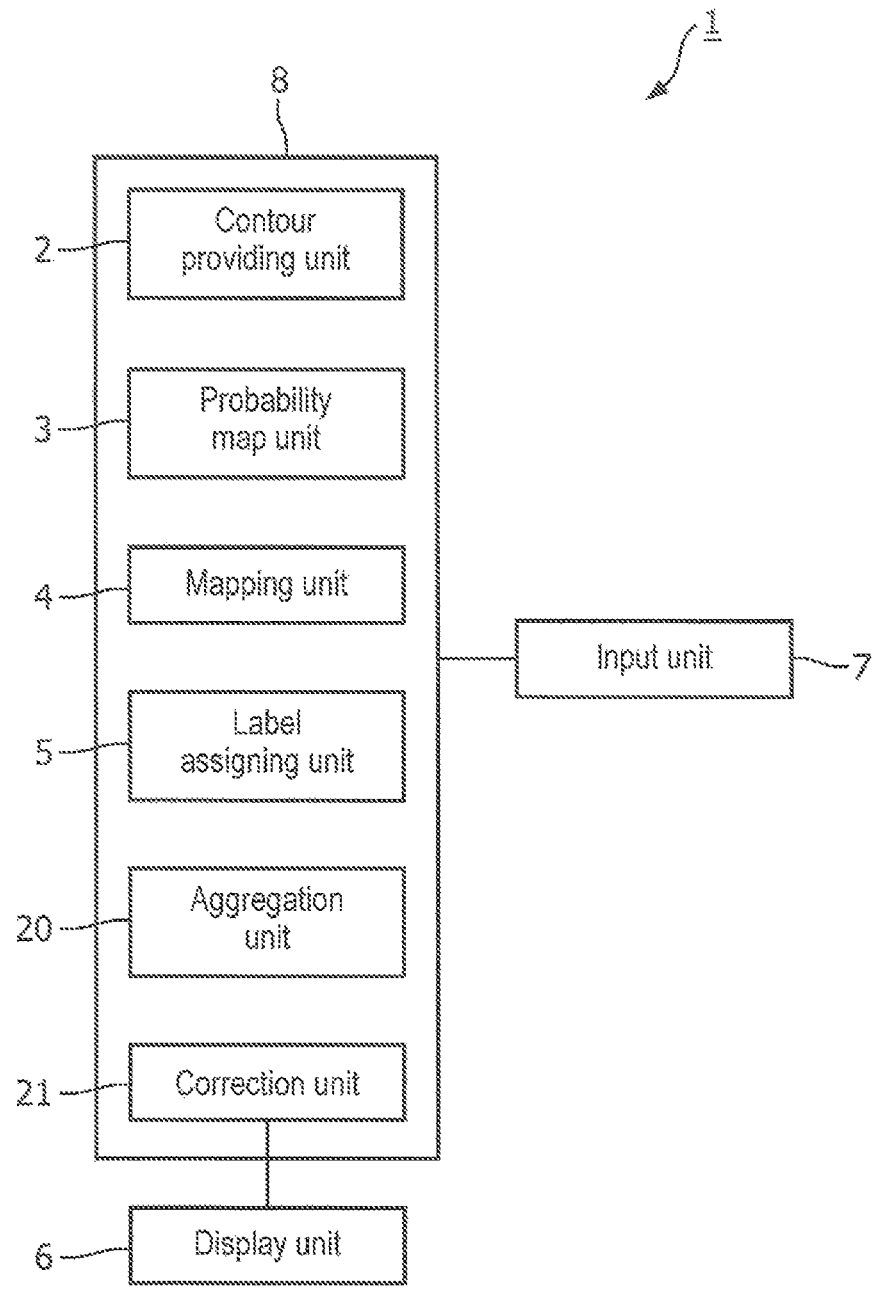
FIG. 1 shows schematically and exemplarily an embodiment of a labeling apparatus for labeling structures of an object shown in an object image.

FIG. 1 shows schematically and exemplarily an embodiment of a labeling apparatus for labeling structures of an object shown in an object image. In this embodiment the object is a person and the object image is a three-dimensional object image of the person like a three-dimensional computed tomography image, a three-dimensional magnetic resonance image or a three-dimensional image acquired by another imaging modality.

The labeling apparatus 1 comprises a processing device 8 including a contour providing unit 2 for providing a contour representing a structure in the object image. The contour providing unit 2 is a graphical user interface allowing a user via an input unit 7 like a mouse, a keyboard, a touchpad, et cetera to draw one or several contours in the object image.

Figure 2:
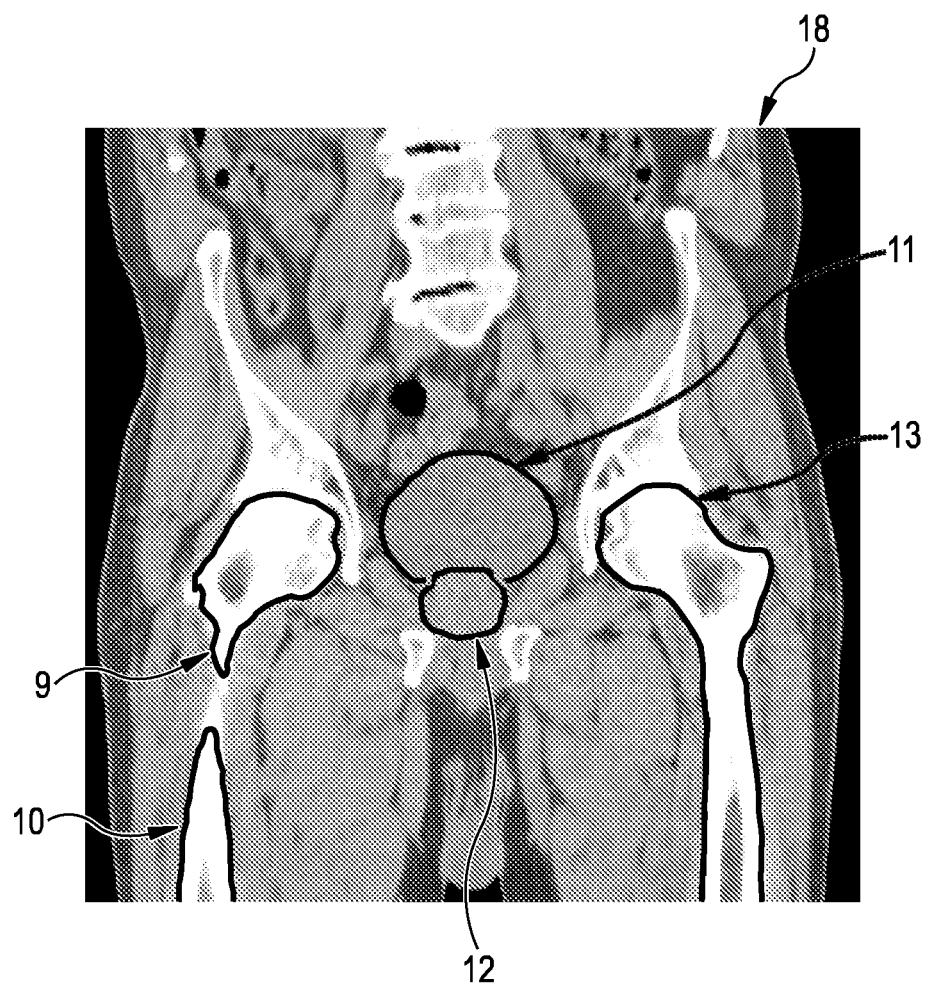
FIG. 2 shows schematically and exemplarily a two-dimensional view of the object image with labeled structures.
Figure 3:
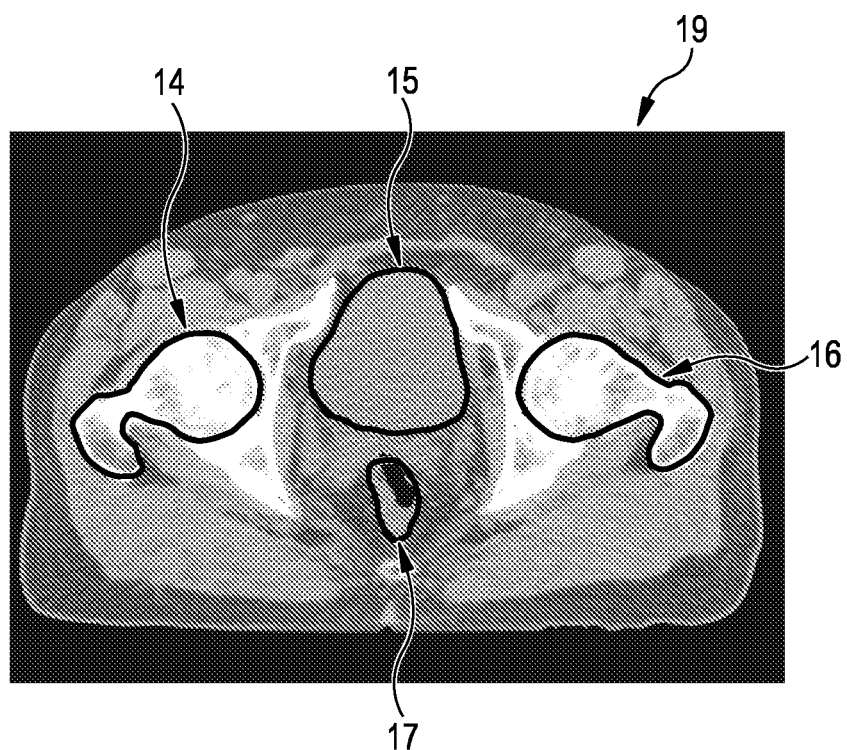
FIG. 3 shows schematically and exemplarily another two-dimensional view of the object image with the labeled structures.

FIG. 2 shows schematically and exemplarily a reformatted two-dimensional view 18 of the three-dimensional image, wherein in this reformatted two-dimensional view two-dimensional contours 9 . . . 13 have been drawn by a user via the contour providing unit 2. FIG. 3 shows schematically and exemplarily another reformatted two-dimensional view 19 of the three-dimensional image, wherein in this view the user has drawn further contours 14 . . . 17.

The processing device 8 further comprises a probability map providing unit 3 for providing a three-dimensional probability map. The probability map indicates for the present kind of object for different labels, which are indicative of different structures of the object, and for different positions in the probability map the probability that the respective structure, i.e. a part of the respective structure, is present at the respective position, wherein the probability depends on the position in the probability map. In this embodiment, the probability map comprises probabilities for at least five structures being the bladder, the rectum, the prostate, the right femur and the left femur. Thus, in this embodiment to each point within the probability map at least five probability values are assigned, wherein the respective probability value indicates the probability that at the respective position the respective structure is present.

The probability map has preferentially the same spatial dimensions as the object image with the contours to be labeled. Thus, for instance, the probability map providing unit can comprise several probability maps which correspond to different regions and/or spatial dimensions of the object to be imaged, wherein for a given object image showing a certain region of the object in certain spatial dimensions a corresponding probability map can be provided.

The processing device 8 further comprises a mapping unit 4 for mapping the three-dimensional probability map to the three-dimensional object image such that the positions in the three-dimensional probability map are assigned to the positions in the three-dimensional object image. Preferentially, the mapping unit 4 is adapted to register the three-dimensional object image and the three-dimensional probability map with respect to each other for performing the mapping. The registration can include a translation, rotation and/or deformation of the object image and/or the probability map such that the object image and the probability map match each other.

In this embodiment the probability map providing unit 3 is adapted to provide the probability map together with a registration image being registered with the probability map, wherein the mapping unit 4 is adapted to register the object image with respect to the registration image, in order to register the object image and the probability map with respect to each other. The mapping unit 4 can perform, for instance, a robust image registration technique or a manual image registration technique for registering the object image with the registration image. The probability map has preferentially been determined based on a plurality of training images comprising labeled contours. The registration image is preferentially an average image being the average of these training images, wherein the average image has preferentially been calculated by averaging image values of corresponding image elements of the different training images.

The mapping unit 4 can be adapted to transform the object image such that deviations between image values of corresponding image elements of the transformed object image and the registration image are minimized. For instance, for each pair of corresponding image elements in the registration image and in the transformed object image a squared difference of image values can be calculated, wherein the object image can be transformed such that the sum of differences, which are calculated for each pair of corresponding image elements in the registration image and the transformed object image, is minimized.

After the mapping unit has mapped the probability map to the object image, to each position within the three-dimensional object image probability values are assigned, which correspond to the different labels. These assignments of the probability values to the positions within the three-dimensional object image are used by a label assigning unit 5 for assigning to each contour 9 . . . 17 a label.

this embodiment, the different labels are different colors, wherein each color indicates a certain structure, i.e., for instance, red indicates the bladder, green indicates the rectum, yellow indicates the prostate, cyan indicates the right femur and light blue indicates the left femur.

The probability map providing unit 3 is preferentially adapted to provide the probability map such that the probability that the respective structure, which is indicated by the respective label, is present at the respective position additionally depends on the image value of the image element of the object image at the respective position. Moreover, the label assigning unit 5 is preferentially adapted to a) define positions of image elements in accordance with the provided contour and with a predefined definition rule, wherein the predefined definition rule defines positions of image elements depending on a contour, b) determine for each label a label probability depending on the probabilities which are defined by the mapped probability map and the defined positions of image elements, and c) assign the label to the contour for which the largest label probability has been determined. In this embodiment, the predefined definition rule defines the positions of the image elements within the respective contour, wherein the label assigning unit 5 is adapted to determine for each label an integral probability as the label probability by integrating the probabilities defined by the mapped probability map, the defined positions of the image elements within the closed contour and the image values of the object image at these defined positions within the closed contour. Thus, to an image element within the respective contour a probability is assigned for a respective label, which depends on the position of the respective image element within the object image and on the image value of this respective image element, wherein the respective probability is defined in the mapped probability map.

For instance, in this embodiment all probabilities for the bladder, which are assigned to image elements within the contour 9, are summed up for calculating an integral probability for the contour 9 and for the label indicating the bladder. Corresponding integral probabilities are also determined for the other labels, i.e. for the other structures being, in this embodiment, the rectum, the prostate, the right femur and the left femur. Thus, in this example five integral probabilities are calculated for the contour 9, wherein the label, for which the largest integral probability has been calculated, is assigned to the contour 9. In this example, the color cyan has been assigned to the contour 9 as the label indicating the right femur. Also for the other contours 10 . . . 17 integral probabilities are determined, wherein for each contour 10 . . . 17 the largest integral probability is determined for determining the label to be assigned to the respective contour 10 . . . 17. In this example, the contours 11, 15 are colored with a red label for indicating the bladder, the contour 17 is colored with a green label for indicating the rectum, the contour 12 is colored with a yellow label for indicating the prostate, the contours 9, 10, 14 are colored with a cyan label for indicating the right femur and the contours 13, 16 are colored with a light blue label for indicating the left femur.

If in an embodiment the contours are not closed, the predefined definition rule can also define positions of image elements traversed by the respective contour and in the vicinity of the respective contour. For each label the label probability can then be determined with respect to these defined positions of image elements and optionally with respect to the image values of the image elements at these positions. The defined positions can be positions within an area enclosing the contour, wherein the label can be determined which has the largest probability with respect to this area. The area can be defined by a predefined distance to the line defining the contour, wherein all positions of the object image which are within the distance are considered. The predefined distance can be a predefined distance in terms of image elements, i.e. voxels or pixels.

The processing device 8 further comprises an aggregation unit 20 for aggregating contours having the same label. For instance, the user can have input several two-dimensional contours in different two-dimensional views of the three-dimensional object image. The aggregation unit 20 can be adapted to then aggregate two-dimensional contours, for which the same label has been determined, to a three-dimensional structure being labeled by the respective label.

Moreover, the processing device 8 comprises a correction unit 21 for allowing a user to modify a label assigned to a contour. The correction unit 21 is preferentially a graphical user interface allowing a user—via the input unit 7—to modify, in this embodiment, a color automatically assigned to a contour by the label assigning unit 5. The label can also be regarded as being the name assigned to a color and, thus, to a contour, wherein a user can modify the label assigned to a certain contour by modifying the name assigned to the contour. For instance, if the label assigning unit 5 has assigned the label "right femur" to a certain contour, but a user identifies the corresponding structure as the bladder, the user can amend the corresponding label to "bladder".

The labeling apparatus 1 further comprises a display unit 6 for displaying the object image, i.e., for example, the two-dimensional views 18, 19, the contours 9 . . . 17 and the labels. In this embodiment, the labels are the colors of the contours 9 . . . 17 such that with displaying the colored contours 9 . . . 17 also the labels are shown.

In an embodiment, the probability map providing unit 3 is adapted to determine a probability map and to provide the determined probability map, wherein the probability map providing unit is adapted to a) receive several images of the object, wherein the images include labeled contours such that to at least some positions within the respective image a label is assigned, and b) determine the probability map based on the received several images with the labeled contours. In particular, the probability map providing unit 3 is adapted to determine the probability map by determining for each label and each position in the images the occurrence of the respective label at the respective position in the images, and determining for different labels and for different positions the probability that the respective structure, which is indicated by the respective label, is present at the respective position based on the determined occurrences. The received several images, which are preferentially registered with respect to each other, can be images, in particular, training images, which are contoured and labeled by a user like a physician and which are used by the probability map providing unit for determining the probability map. The newly determined probability map can also be combined with an already existing probability map, in order to update the existing probability map.

In particular, the probability map providing unit 3 can be adapted to determine for each label a histogram of image values, which have been assigned to the respective label in the received several images. The probability that a certain image value is present, given a certain label, can then be determined based on the histogram determined for the given label. For instance, the histogram determined for a given label can be normalized and the normalized histogram can directly provide the probability for an image value given the respective label. Moreover, for each position within the received images the occurrence of each label can be determined and the probability for a label given a certain position within an object image can be determined based on the determined occurrences. In particular, for each position the occurrences can be normalized such that the sum of the normalized occurrences, which have been determined for the same position and for the different labels, is one. The normalized occurrence determined for a certain label and a certain position can be regarded as being the probability for the certain label, if the certain position is given. The probability map providing unit 3 can be adapted to provide the probability map by providing the product of the probability for a certain label, if a certain position is given, and the probability for a certain image value, if a certain label is given. The probability map can therefore be stored in the probably map providing unit 3 by storing these two different conditional probabilities.

The probability map providing unit 3 can also be adapted to incorporate a new label assigned to a contour in the actual object image into an existing probability map. In particular, the probability map providing unit 3 can be adapted to determine an intermediate probability map based on the object image with the provided contour and to update the provided probability map based on the intermediate probability map. For instance, if to the actual object image only a contour with a new label has been added, a probability for a label, if a certain position is given, can be determined, wherein for positions outside of the contour this probability is zero and for positions within the contour this probability is one. In order to update the existing probability map regarding this probability, for each position the probability for the new label provided by the intermediate probability map can be weighted by a first weight and the probabilities of the already existing labels provided by the existing probability map can be weighted by a second weight, wherein the weighted probabilities of the two probability maps can be normalized such that the sum of the weighted probabilities is one. The resulting normalized probabilities are the probabilities of the updated probability map, wherein these probabilities define the probability for a certain label, which may now also be the new label, if a certain position is given. The first weight is preferentially smaller than the second weight. The first weight and the second weight can be predefined such that the first weight is a predefined part of the second weight, or the first weight can be similar to the smallest probability assigned to a label at the respective position by the existing probability map and the second weight can be one. For updating the existing probability map regarding the probability for an image value, if a label is given, the normalized histogram of image values for the new label determined from the actual object image with the contour comprising the new label is added to the existing probability map. The updated existing probability map then provides the product of the probability for the respective label, if the position is given, and the probability for the image value, if the label is given, wherein now also the new label is included.

Figure 4:
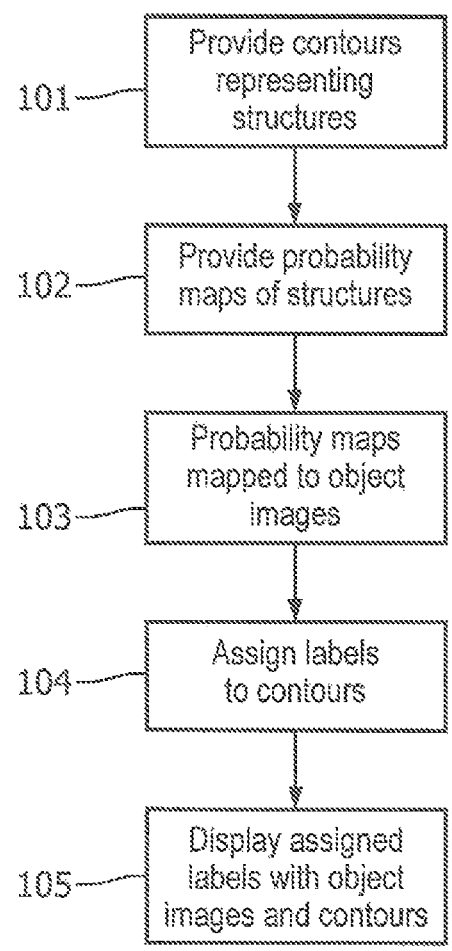
FIG. 4 shows a flowchart exemplarily illustrating an embodiment of a labeling method for labeling structures of an object shown in an object image.

In the following an embodiment of a labeling method for labeling structures of an object shown in an object image will exemplarily be described with reference to a flowchart shown in FIG. 4.

In step 101, contours representing structures in the object image are provided by a contour providing unit. In particular, the contour providing unit is a graphical user interface allowing a user to draw contours within the object image via an input unit like a keyboard, a mouse, a touchpad, et cetera. Preferentially, the object image is a three-dimensional image, wherein on a display unit a reformatted two-dimensional view of the three-dimensional image is shown and wherein the user can draw two-dimensional contours in the three-dimensional image.

In step 102, a probability map is provided by a probability map providing unit, wherein the probability map indicates for different labels, which are indicative of different structures of the object, and for different positions in the probability map the probability that the respective structure, which is indicated by the respective label, is present at the respective position. In step 103, the probability map is mapped to the object image by a mapping unit such that positions in the probability map are assigned to positions in the object image, thereby assigning the probabilities to these positions in the object image. In step 104, a label is assigned to one or several contours provided in step 101 based on the mapped probability map by a label assigning unit. In step 105, the assigned labels are displayed together with the object image and the contours by a display unit 6.

Many applications are based on an accurate delineation of anatomical organs in every slice of three-dimensional medical images. In radiotherapy planning (RTP), the delineation of organs at risk and tumours in three-dimensional computed tomography and magnetic resonance images are used for optimizing treatment beams. The delineation is part of the input to the treatment planning system and is ideally obtained from an automatic system. However, automatic systems may fail for certain organs or for certain patients due to low image contrast, highly variable image contrast across patients, large shape variability, unusual anatomy caused by, for instance, missing organs, implants, et cetera, or other reasons. Examples of such organs/regions are the parotids, the neck nodal levels, the seminal vesicles and others. Some users may even prefer to do manual delineation, or delineate additional structures that are not usually delineated at other institutions.

Generally, in known systems several user interactions are necessary for manually delineating an anatomical structure like an organ or a part of an organ. For instance, for each anatomical structure a user may type, in a labeling step, a name for the respective anatomical structure. Then, in a contouring step the user may select a two-dimensional slice of the three-dimensional image and a desired contrast, for instance, a desired window and level, and draw a contour using drawing tools. This contouring step may be repeated several times until the desired anatomical structure is delineated in all two-dimensional slices of the three-dimensional image. If the user wants to delineate several organs in one slice, the user typically scrolls through all the slices of one organ and delineates them before the user starts contouring the next organ. This can be unsatisfactory, because often several organs are visible in the same slice and could be advantageously, simultaneously contoured. Sometimes it can be helpful to delineate a part of some other organs before finishing an organ with difficult contrast, for instance, while searching for the apex of the prostate, a part of the rectum can be delineated. Moreover, the user has to decide which organ to delineate, think about labeling and interacting with menus instead of looking at and thinking about the anatomy in the object image. Moreover, these labeling and contouring steps of known labeling systems are very time consuming.

In contrast, the labeling apparatus described above with reference to FIGS. 1 to 3 is adapted to automatically attribute a label to contours drawn by the user. The delineation of, for instance, anatomical regions or anatomical organs, becomes therefore easier and simpler. The user can start drawing contours as soon as the user sees structures of interest. The labels can be configured and new labels can be learned by the labeling apparatus. Contours with the same label belong to the same organ and are automatically aggregated together. The labeling apparatus attributes the most probable label to a contour. However, the user can always make corrections by using the correction unit.

The labeling apparatus can make use of an approximate segmentation of the object image under consideration. This segmentation can be obtained by mapping a three-dimensional probability map to the object image. The mapping may be calculated by robust image registration, by manual registration, wherein landmarks are manually indicated in the object image and used for the registration with the probability map, or by registering already drawn contours with an atlas. The registration may only be approximate. The probability map indicates the probability of a label at any position in the object image and may be trained off-line by the vendor or on-line from examples, in particular, from new structures countered and labeled by a user. For each two-dimensional contour made by the user, the label with the highest probability is attributed to the contour. If the contour is closed, the label with the highest integral probability inside the contour is attributed. If the contour is not closed, the label with highest integral probability close to the contour may be attributed. The contour can be created in any reformatted two-dimensional view of the three-dimensional image, in particular, as long as a binary mask can be created. Especially the user may select an axial, coronal or saggital view on a selected dataset to create the contour.

The labeling apparatus can be integrated into a radiotherapy planning work station like Pinnacle$^3$ from the company Philips. The labeling apparatus can also be integrated or used together with image guided intervention systems that need manual delineations like radio frequency ablation planning systems, biopsy planning systems, surgery planning systems, et cetera.

Although in above described embodiments certain anatomical structures like the bladder, the rectum, the prostate, et cetera have been mentioned, the labeling apparatus and labeling method can also be adapted to label other anatomical structures.

Although in above described embodiments the object is a person, wherein structures of the person are labeled, in other embodiments the object can also be an animal or a technical object, wherein the labeling apparatus and labeling method can be adapted to label structures of the animal or the technical object, respectively.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Steps like providing steps for providing a contour or a probability map or like calculation steps for calculating a mapping of the probability map to the object image or for assigning a label to a contour performed by one or several units or devices can be performed by any other number of units or devices. For example, steps 101 to 104 can be performed by a single unit or by any other number of different units. The steps, in particular, the provision and/or calculation steps, and/or the control of the labeling apparatus in accordance with the labeling method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a labeling apparatus for labeling structures of an object shown in an object image. A probability map providing unit provides a probability map, the probability map indicating for different labels, which are indicative of different structures of the object, and for different positions in the probability map the probability that the respective structure, which is indicated by the respective label, is present at the respective position, wherein the probability depends on the position in the probability map. The probability map is mapped to the object image by a mapping unit, wherein a label assigning unit assigns to a provided contour, which represents a structure in the object image, a label based on the mapped probability map. This allows automatically labeling structures of the object, which are indicated by provided contours in the object image, with relatively low computational efforts.

The invention claimed is:

1. A labeling apparatus for identifying and labeling three-dimensional structures of an object shown in a three-dimensional medical image, the labeling apparatus comprising:

a computing device having a processor and a memory, together with a graphical user interface, a contour unit configured to provide three-dimensional contour images representing three-dimensional structures in the medical image, a probability map unit configured to provide a three-dimensional probability map, the probability map indicating for different labels, which are indicative of different three-dimensional structures of said object in the medical image, and for different positions in the probability map, the probability that each of said different structures, indicated by said structure's respective label is present at said structure's respective position, wherein said probability depends on the position of said structure in the probability map, a mapping unit configured to map said three-dimensional probability map to the three-dimensional medical image such that the positions of the three-dimensional structures in the probability map are assigned to positions of three-dimensional contour images in the medical image, and a label assigning unit configured to assign a label to each three-dimensional contour image based on the mapped three-dimensional probability map, wherein said label assigning unit is adapted to define positions of image elements in accordance with the provided three-dimensional contour image and a predefined definition rule, the predefined definition rule defining three-dimensional positions of image elements depending on a three-dimensional contour, determine for each label a label probability depending on the probabilities which are defined by the mapped probability map and the defined three-dimensional positions of image elements and identify the label of largest label probability for each three-dimensional contour image, and assign the label to the three-dimensional contour image for which the largest label probability has been determined, and wherein data relating to said three-dimensional contour image and said three-dimensional medical image are not divided into a series of two-dimensional image slices for determining said label probability and assigning said label.

2. The labeling apparatus as defined in claim 1, wherein the contour providing unit is adapted to allow a user to add a contour line to the three-dimensional medical image.

3. The labeling apparatus as defined in claim 1, wherein the mapping unit is adapted to register the three-dimensional medical image and the three-dimensional probability map with respect to each other for performing the mapping.

4. The labeling apparatus as defined in claim 3, wherein the probability map providing unit is adapted to provide the probability map together with a registration image being registered with the probability map and wherein the mapping unit is adapted to register the medical image with respect to the registration image, in order to register the medical image and the probability map with respect to each other.

5. The labeling apparatus as defined in claim 1, wherein the probability map providing unit is adapted to provide the three-dimensional probability map such that the probability that the respective structure, which is indicated by the respective label, is present at the respective position additionally depends on an image value.

6. The labeling apparatus as defined in claim 1, wherein the predefined definition rule defines three-dimensional positions of image elements within the three-dimensional contour image, if the contour image is closed, wherein the label assigning unit is adapted to determine for each label an integral probability as the label probability by integrating the probabilities defined by the mapped probability map and by the defined positions of the image elements within the three-dimensional contour image.

7. The labeling apparatus as defined in claim 1, wherein the probability map providing unit is adapted to provide the probability map such that the probability that the respective structure, which is indicated by the respective label, is present at the respective position additionally depends on an image value, wherein the label assigning unit is adapted to determine for each label the label probability depending on the probabilities which are defined by the mapped probability map, the defined positions of image elements and the image values of the three-dimensional contour image at these defined positions.

8. The labeling apparatus as defined in claim 7, wherein the predefined definition rule defines positions of image elements within the contour image, if the contour image is closed, and wherein the label assigning unit is adapted to determine for each label an integral probability as the label probability by integrating the probabilities defined by the mapped probability map, the defined positions of the image elements within the closed contour image and the image values of the contour image at these defined positions.

9. The labeling apparatus as defined in claim 1, wherein the predefined definition rule defines positions of image elements traversed by the contour image and in the vicinity of the contour image.

10. The labeling apparatus as defined in claim 1, wherein the probability map providing unit is adapted to determine a three-dimensional probability map and to provide the determined three-dimensional probability map, wherein the probability map providing unit is adapted to:

receive several three-dimensional images of the object, wherein the three-dimensional images include labeled contours such that to at least some positions within the respective image a label is assigned, determine the three-dimensional probability map based on the received several three-dimensional images with the labeled contours.

11. The labeling apparatus as defined in claim 10, wherein the probability map providing unit is adapted to determine the three-dimensional probability map by:

determining for each label and each position in the three-dimensional images the occurrence of the respective label at the respective position in the images, and determining for different labels and for different positions the probability that the respective structure, which is indicated by the respective label, is present at the respective position based on the determined occurrences.

12. The labeling apparatus as defined in claim 1, wherein the probability map providing unit is adapted to determine an intermediate three-dimensional probability map based on the three-dimensional medical image with the provided three-dimensional contour image and to update the provided probability map based on the intermediate probability map.

13. A computer-implemented method for identifying and labeling three-dimensional structures of an object shown in a medical image, the labeling method comprising:

a computing device having a processor and a memory, with a graphical user interface, displaying three-dimensional contour images representing ft three-dimensional structures in the medical image generated by a contour providing unit, displaying a three-dimensional probability map generated by a probability map unit, the probability map indicating for different labels, which are indicative of different structures of said object in the medical image, and for different positions in the probability map, the probability that each of said different structures, indicated by said structure's respective label is present at said structures' respective positions, wherein said probability depends on the positions of said structures in the probability map mapping the three-dimensional probability map to the medical image by a mapping unit, such that the positions of the structures in the probability map are assigned to positions of contour images in the medical image, and assigning a label, by a label assigning unit, to each three-dimensional contour image based on the mapped probability map, wherein assigning the label comprises;

defining positions of image elements in accordance with the provided contour image and a predefined definition rule, the predefined definition rule defining positions of image elements depending on a contour, determining for each label a label probability depending on the probabilities which are defined by the mapped probability map and the defined positions of image elements and identifing the label of largest label probability for each contour image, and assigning the label to the contour image for which the largest label probability has been determined, and displaying said contour image together with said assigned labels, wherein data relating to said three-dimensional contour image and said three-dimensional medical image are not divided into a series of two-dimensional image slices for determining said label probability and assigning said label.

14. A non-transitory computer readable storage medium storing one or more programs for identification and labeling of three-dimensional structures of an object in a medical image, the one or more programs comprising instructions, which when executed by a computing device with a graphical user interface, cause the device to carry out the steps of the labeling method as defined in claim 13.

\* \* \* \* \*